United States Patent

[11] 3,634,599

[72] Inventor Donald L. Kliewer
  Minneapolis, Minn.
[21] Appl. No. 77,110
[22] Filed Oct. 1, 1970
[45] Patented Jan. 11, 1972
[73] Assignee The Telex Corporation
  Tulsa, Okla.

[54] ELECTRICAL JUNCTION BOX
  10 Claims, 3 Drawing Figs.
[52] U.S. Cl.................................................... 174/52 R,
  174/50, 339/99
[51] Int. Cl..................................................... H05k 5/00
[50] Field of Search............................................ 174/52 R,
  52 S, 50, 50.5; 317/120, 99; 339/97 R, 98, 99

[56] References Cited
  UNITED STATES PATENTS
3,002,044 9/1961 Scoville....................... 174/52 R 3,571,771 3/1971 Stephanson.................. 174/52 R Primary Examiner—Darrell L. Clay
Attorney—Carlsen, Carlsen & Sturm ABSTRACT: A molded plastic junction box having a hinged outer panel covering one end of the box with a removable inner panel that rests upon a peripheral ledge around the open end of the box underneath the hinged outer panel. A slot is formed in the inner panel near the hinged end of the outer panel for receiving three insulated conductors in side-by-side relation. Three sharp prongs are positioned within the slot in alignment with a corresponding one of the insulated conductors. When the hinged outer panel is closed, it presses the insulated conductors against the prongs and causes the prongs to pierce the insulation and make contact with the electrically conducting wires therewithin. Electrical connectors are attached to the prongs to receive conductors for coupling the prongs to electrical components within the box. The outer panel is secured to the box in its closed position by means of a nonlocking latch which can be easily opened for inspection or repair purposes.

PATENTED JAN 11 1972

3,634,599

INVENTOR.
DONALD KLIEWER
BY
Carlsen Carlsen & Sturm
ATTORNEYS

3,634,599

ELECTRICAL JUNCTION BOX

BACKGROUND OF THE INVENTION

This invention relates to junction boxes for holding electrical components such as variable resistors, phone jacks, or the like. Many different types of junction boxes have been manufactured in the past, but although the prior art junction boxes have been adequate in terms of supporting and insulating the electrical components therewithin, they have been lacking in terms of convenience with respect to making the required electrical connections to the components, and in gaining access to the components for inspection or repair purposes. Accordingly, the principal object of this invention is to provide an improved junction box in which electrical connections can be more conveniently made and in which easy access is afforded to these components for inspection or repair purposes. A further object of this invention is to provide a junction box of the above noted character which is simple in construction, reliable in use, and inexpensive in cost.

SUMMARY OF THE INVENTION

In accordance with this invention, the above noted objectives are achieved by providing a hinged outer panel for covering the open end of the junction box with a removable inner panel that rests upon a peripheral ledge around the open end of the box underneath the hinged outer panel. A slot is formed in the inner panel near the hinged end of the outer panel for receiving a plurality of insulated conductors in side-by-side relation and a plurality of sharp upstanding prongs are positioned within the slot in alignment with a corresponding one of the insulated conductors. When the hinged outer panel is closed, it presses the insulated conductors against the prongs and causes the prongs to pierce the insulation and make contact with the electrically conductive wires therewithin. Electrical connectors are attached to the prongs to receive conductors for coupling the prongs to electrical components within the box. The outer cover is secured to the box in its closed position by means of a nonlocking latch which can be easily opened for inspection or repair purposes. The combination of the hinged outer panel and the removable inner panel expedites the connection of electrical conductors to the box and also makes it possible to easily uncouple the electrical conductors and to open the box if desired for inspection or repair purposes. Other advantages of the invention will be apparent to those skilled in the art from the following description of one illustrative embodiment thereof as illustrated in the attached drawings.

DESCRIPTION OF THE INVENTION

Figure 1:
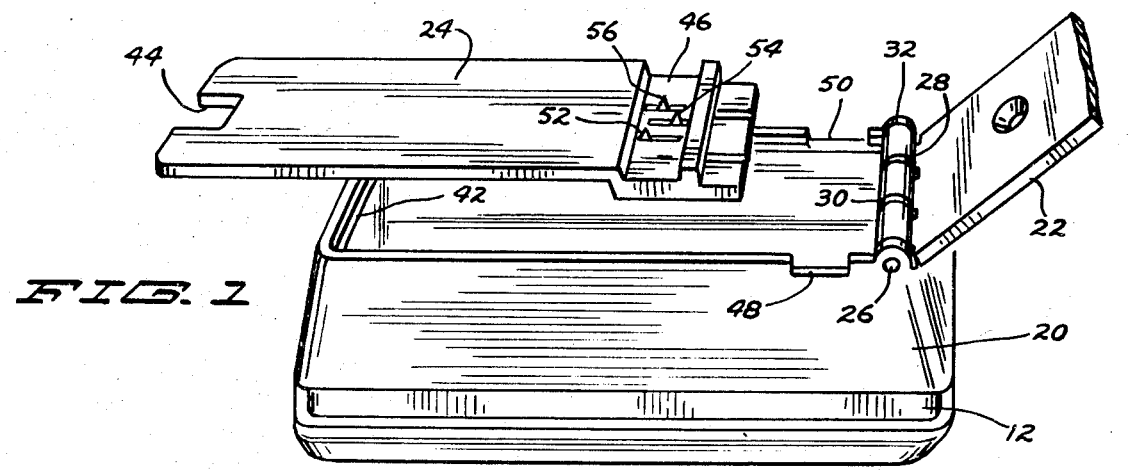
FIG. 1 is a perspective view of one illustrative embodiment of the invention showing the hinged cover thereof in its open position and the inner panel thereof removed.

The drawings show one illustrative embodiment of the invention which is adapted to serve as a mounting for a volume control and earphone jack on the side of an aircraft seat to permit the passengers to listen to in-flight television programs by means of individual earphones and to control the volume at their individual earphones. The junction box contains a front panel 10 having four upstanding side panels 12 joined thereto. The front panel 10 is adapted to receive a headset jack 14 and a potentiometer 16 which is controlled by a knob 18. The jack 14 serves as an audio outlet to a pair of headphones and the potentiometer 16 and knob 18 serve as a volume control for the audio output. The front panel 10 and upstanding edge panels 12 comprise an integrally molded plastic unit which is separable from the remainder of the junction box for the purpose of being used as a front panel mounting for the components attached thereto or for being used in combination with a different type of junction box. For this reason, the outer periphery of the upstanding side panels 12 is recessed so that it can be fitted into an opening cut in a panel or into a different type of junction box if desired.

The upstanding edge panels 12 are joined on their inner periphery by means of a suitable plastic cement to an integrally molded plastic body member 20 having four upstanding side panels which are joined together at their corners and open at both ends. The body member 20 is adapted at one end to be joined to the upstanding side panels 12 and to serve as extensions thereof and is adapted at its other end to receive a hinged outer cover panel 22 and a removable inner cover panel 24 which constitute the principal novel features of this invention. Outer cover panel 22 is hinged to the body member 20 by means of a hinge pin 26 which is attached at both ends to opposing sides of the body member 20 and engages a central opening in a hinged portion formed on one end of the outer cover panel 22. The hinge is held in axial alignment by means of two ribs 28 and 30 which engage matching openings in the hinge member at the end of outer cover panel 22. The hinge at the outer end of cover panel 22 comprises a rolled over edge portion 32 which has two slots formed therein to match and engage the ribs 28 and 30.

A resilient spring metal latch member 34 is attached to the other end of outer cover panel 22 and projects transversely therefrom to engage a latch opening 36 formed in body member 20 for securing the outer cover panel to the body member in its closed position. The latch member 34 and latch engaging recess 36 are nonlocking so that the outer cover panel 22 can be easily opened by simply applying enough pressure to move the latch member 34 out of engagement with the latch opening 36. In this embodiment of the invention, the outer cover panel 22 is adapted to be secured to the arm of an airplane seat by means of screws which extend through two countersunk openings 38 and 40 in the outer panel 22.

Figure 2:
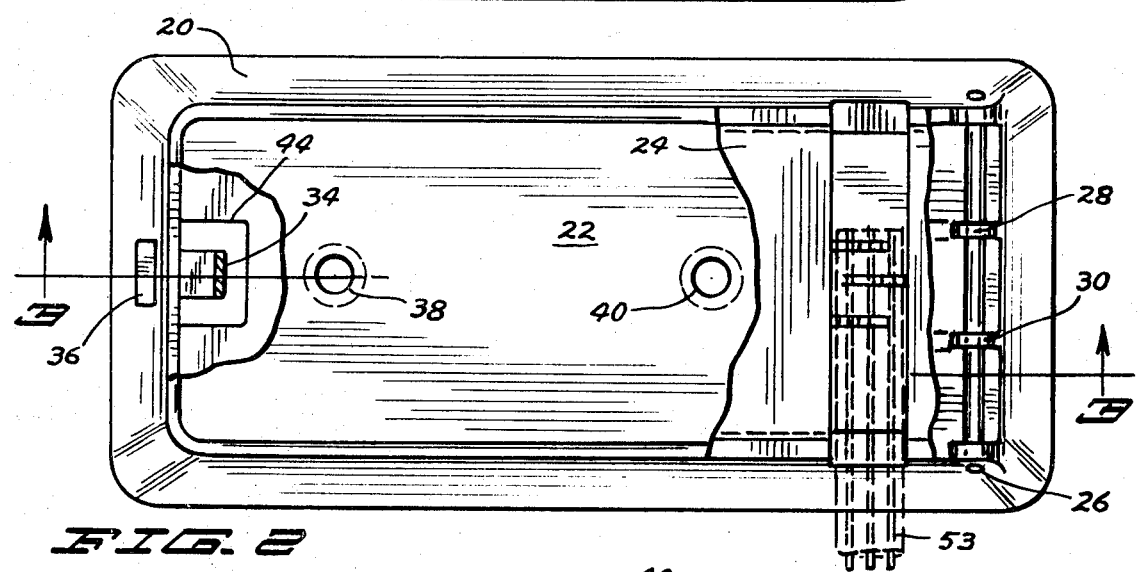
FIG. 2 is a plan view of the embodiment of FIG. 1 with the inner panel in place and the outer hinged panel in its closed position.
Figure 3:
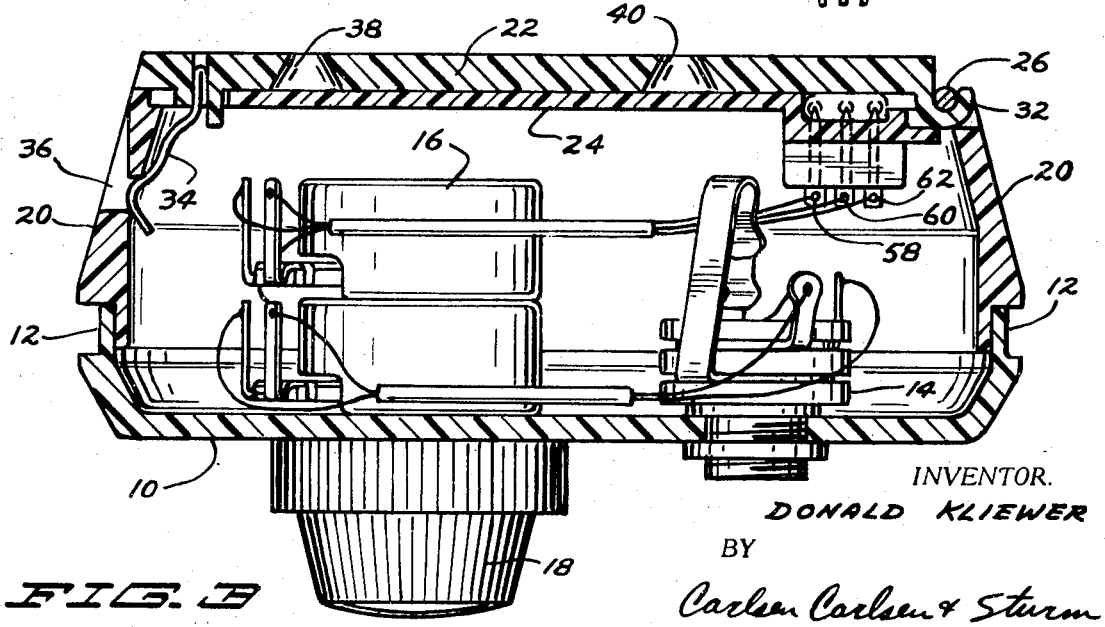
FIG. 3 is a cross-sectional view taken on the plane 3—3 of FIG. 2.

Inner cover panel 24 is dimensioned to fit inside of the junction box underneath the outer cover panel 22 and is supported by a recessed ledge 42 which extends around the peripheral edges of the body member 20. An opening 44 is formed in one end of inner cover panel 24 to permit the latch member 34 to pass through the inner cover panel, and a slot 46 is formed transverse to the other end of outer cover panel 22 for the purpose of receiving three electrical conductors 53 in side-by-side arrangement. Matching depressions 48 and 50 are formed in the edge of the body member 20 adjacent to the two ends of the slot 46 to permit the three insulated conductors to extend therethrough. Three sharp prongs 52, 54, and 56 project upwardly in the slot 46 in alignment with a corresponding one of the three electrical conductors to make contact therewith. The sharp prongs 52, 54 and 56 are made of an electrically conducting material and extend completely through the inner cover panel 24 as best shown in FIG. 3. Three electrical connectors 58, 60 and 62 are attached to the ends of prongs 52, 54, and 56 for electrical connection to the components within the junction box. As best shown in FIGS. 2 and 3, the width of slot 46 is approximately equal to the width of the three insulated electrical conductors in side-by-side relation and the depth of slot 46 is approximately equal to the depth of the conductors. Accordingly, when the conductors 53 are placed in the slot 46, and the outer cover panel 22 is closed, the sharp prongs 52, 54 and 56 will be forced against the insulation and will pierce the insulation and make contact with the corresponding electrically conductive portion of the cable 53. As long as the outer cover panel 22 remains closed, the prongs 52, 54, and 56 will be held in contact with their respective electrical conductors, but when the outer cover panel 22 is opened, the electrical connection can be easily opened by hand to permit checking of continuity and resistance values of the jack 14 and potentiometer 16 by placing the meter probes directly on the prongs 52, 54, and 56. Direct access can be gained to the jack 14 and potentiometer 16 for inspection and repair purposes by simply removing the inner panel 24 from the peripheral ledge upon which it rests. The novel junction box of this invention is equally convenient in terms of installing the electrical components therewithin and in making the required electrical connections to the components.

It will be apparent from the foregoing description that this invention provides a simple, inexpensive junction box in which electrical connections can be more conveniently made to the electrical components therewithin and in which easy access is afforded to these components for inspection or repair purposes. And although this invention has been described in connection with one illustrative embodiment thereof, it should be understood that this invention is by no means limited to the disclosed embodiment since many modifications can be made in the disclosed structure without altering the basic configuration thereof. For example, instead of being detachable from the main body of the junction box, the front panel 10 could be integrally joined to the body member 20 of the junction box. Also, in some embodiments of the invention, the electrical components will be contained entirely in the interior of the box rather than projecting through the front panel as they do in the disclosed embodiment. These and many other modifications of the invention will be apparent to those skilled in the art, and this invention includes all modifications falling within the scope of the following claims.

I claim:

1. A junction box comprising a front panel, a plurality of edge panels joined to the periphery of said front panel and projecting transversely therefrom, a rear panel hinged at one end to one of said edge panels, latch means attached to the other end of said rear panel, latch engaging means attached to the opposing edge panel receiving said latch means, an inner panel disposed within said junction box adjacent to said rear panel, ledge means formed in said edge panels supporting said inner panel adjacent to said rear panel, a slot formed in said inner panel on the surface thereof adjacent to said rear panel, said slot extending transversely across said inner panel and adapted to receive an insulated electrical conductor, at least one sharp prong attached to said inner panel within said slot and projecting outwardly toward said rear panel, said sharp prong being made of an electrically conductive material and being positioned to extend into and be aligned with the electrically conductive portion of an insulated electrical conductor when disposed within said slot, the depth of said slot being approximately equal to the thickness of said electrical conductor, and said inner panel being positioned immediately adjacent to said rear panel, whereby the closing of said hinged rear panel will force said electrical conductor against said sharp prong and cause the prong to pierce the insulation and make contact with the electrically conductive material therewithin.

2. The junction box of claim 1 and further comprising means for mounting at least one electrical component within said junction box.

3. The junction box of claim 2 and further comprising an electrical connector element attached to said sharp prong and projecting below the inner surface of said inner panel.

4. The junction box of claim 3 wherein said slot is adapted to receive a plurality of insulated electrical conductors which are positioned in said slot in side-by-side relationship, and further comprising a plurality of sharp prongs attached to said inner panel within said slot and projecting upwardly therefrom, said sharp prongs being made of an electrically conductive material and being positioned to be aligned with the electrically conductive portion of a corresponding one of said insulated electrical conductors, and a plurality of electrical connector elements each attached to a corresponding one of said sharp prongs and projecting below the inner surface of said inner panel.

5. The junction box of claim 4 wherein said slot is located near the end of said inner panel adjacent to the hinged end of said rear panel.

6. The junction box of claim 5 and further comprising recesses formed in the upper edges of the edge panels adjacent to the ends of said slot.

7. The junction box of claim 6 and further comprising an opening formed in the end of said inner panel adjacent to said latch means to permit the latch means to pass through said inner panel to engage said latch engaging means.

8. The junction box of claim 7 in which the peripheral dimensions of said inner panel are larger than the inside peripheral dimensions of said edge panels and smaller than the outside peripheral dimensions thereof, and wherein said ledge means comprises a peripheral recess in the inner peripheral edges of said edge panels.

9. The junction box of claim 8 wherein the end of said inner panel adjacent to the hinged end of said rear panel is disposed underneath the hinge thereof.

10. The junction box of claim 9 in which the depth of said peripheral recess in said edge panels is approximately equal to the thickness of said inner panel and wherein said hinged rear panel rests upon the peripheral edge of said edge panels in its closed position.

* * * * *